(12) United States Patent
Oomen

(10) Patent No.: US 11,420,546 B2
(45) Date of Patent: Aug. 23, 2022

(54) SEAT ASSEMBLY HAVING COMPRESSION LIMITER WITH WAVE PORTION

(71) Applicant: Illinois Tool Works Inc., Glenview, IL (US)

(72) Inventor: Craig M. Oomen, Lowell, MI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 16/965,145

(22) PCT Filed: Feb. 22, 2019

(86) PCT No.: PCT/US2019/019237
§ 371 (c)(1),
(2) Date: Jul. 27, 2020

(87) PCT Pub. No.: WO2019/165268
PCT Pub. Date: Aug. 29, 2019

(65) Prior Publication Data
US 2021/0039534 A1   Feb. 11, 2021

Related U.S. Application Data

(60) Provisional application No. 62/633,949, filed on Feb. 22, 2018.

(51) Int. Cl.
*B60N 2/70* (2006.01)
*A47C 7/30* (2006.01)
(Continued)

(52) U.S. Cl.
CPC .............. *B60N 2/7094* (2013.01); *A47C 7/30* (2013.01); *A47C 7/34* (2013.01); *B60N 2/5657* (2013.01); *B60N 2/5685* (2013.01)

(58) Field of Classification Search
CPC ...... B60N 2/62; B60N 2/7094; B60N 2/5657; B60N 2/5685; A47C 7/30; A47C 7/34
See application file for complete search history.

(56) References Cited

U.S. PATENT DOCUMENTS 6,193,318 B1    2/2001  Becker et al.
9,365,142 B1*   6/2016  Line ..................... B60N 2/0284
(Continued)

FOREIGN PATENT DOCUMENTS

| CN | 17284312 A | 10/2017 |
| DE | 19801893 A1 | 7/1999 |
| EP | 1564067 A1 | 8/2005 |

OTHER PUBLICATIONS

International Search Report and Written Opinion for PCT/US2019/019237, dated May 7, 2019. (9 pages).

*Primary Examiner* — Philip F Gabler
(74) *Attorney, Agent, or Firm* — Quarles & Brady LLP

(57) ABSTRACT

A seat assembly includes a frame, a seating base layer arranged on the frame and a compression limiter layer arranged on the seating base layer. The compression limiter layer includes a coil portion and a wave portion having a curved profile. The wave portion includes a plurality of wave elements and one or more ribs connected between the wave elements. The seat assembly further includes a load distribution layer connected to the compression limiter layer and an adjustment module movable between a rear position and a forward position. The adjustment module is configured to move the wave portion between a retracted position and an extended position.

10 Claims, 9 Drawing Sheets

(51) Int. Cl.
*A47C 7/34* (2006.01)
*B60N 2/56* (2006.01)

(56) References Cited

U.S. PATENT DOCUMENTS

| | | | | |
|---|---|---|---|---|
| 9,527,418 | B2* | 12/2016 | Sachs | B60N 2/995 |
| 9,707,877 | B2* | 7/2017 | Kondrad | B60N 2/62 |
| 10,611,270 | B2* | 4/2020 | Vanfossen | B60N 2/0244 |
| 10,640,011 | B2* | 5/2020 | Anzenberger | B60N 2/62 |
| 10,899,254 | B2* | 1/2021 | Line | B60N 2/0232 |
| 2013/0313875 | A1 | 11/2013 | Brncick et al. | |
| 2014/0203617 | A1* | 7/2014 | Line | B60N 2/929 |
| | | | | 297/423.29 |
| 2016/0207433 | A1 | 7/2016 | Kondrad et al. | |

* cited by examiner

SEAT ASSEMBLY HAVING COMPRESSION LIMITER WITH WAVE PORTION

The present application represents the United States National Stage of International Application No. PCT/US2019/019237, filed Feb. 22, 2019, which claims priority to U.S. Provisional Patent Application No. 62/633,949, filed Feb. 22, 2018, the entire contents of which are incorporated by reference in their entirety.

BACKGROUND

The following description relates to an adjustable seat assembly for use in automotive applications, office furniture and recreational vehicle seating.

Automotive seating designs have traditionally used common materials and processes across manufacturers. Known seating designs typically include steel frames, steel suspensions and compression limiters, accompanied by fabric or leather trim covers. Compression limiters are most commonly implemented in automotive seating as foam layers. Compression limiters are used to distribute reaction forces, diffuse occupant stress spikes and offer controlled deflection under forces resulting in energy absorption.

In known automotive seating designs, the commonly used foam layers, as compression limiters, have been found suitable for providing comfort and load distribution, observable in pressure map testing. The comfort of foamed seating (i.e., seating designs including the foam layers) is determined, at least in part, by the foam durometer, thickness and porosity to control indentation force deflection (IFD), which is a commonly used measurement to judge and control comfort. The foamed materials of the foam layers are typically thermoset materials.

Some automotive seating designs include additional features such as seat heating and/or cooling devices. The heating and cooling devices may include resistive electrical circuitry (for heating) and related electrical component such as wire harnesses and the like, Peltier thermoelectric generators, blowers, fans and the like. In some seating designs, a vacuum generated by a fan blower can provide a cooling sensation to the occupant by pulling air and moisture from the occupant through the seat using a manifold system through the foam layers. In some instances, seating designs include further components configured to dampen buzz, squeak and rattle (BSR) of the fan blowers.

Known automotive seating designs may include features to customize seat fit and ergonomic function for individual body shapes and sizes. For example, 4-way and 8-way adjustable seats have become common in the market, and more recently, 33-way adjustable seats have been developed. Adjustable seats of these types articulate using electrical motorized actuators and air driven bladders. In some designs, pulse actuation is used for providing vibration massage functionality. The foam layers commonly used in automotive seating designs have been found suitable for accommodating such adjustability in automotive seating applications, while offering suitable IFD characteristics throughout a range of positions during adjustment.

However, the commonly used foam layers tend to be bulky and can occupy a significant volume in an automotive interior. In addition, the foam layers have inherent insulative characteristics which require additional design considerations in heating and cooling systems to provide a desired level of comfort to a seated occupant. Further, it can be difficult to integrate additional seating components, including heat and cooling system components, electrical components such as wire-harnesses, seat adjustment modules and other auxiliary components with the foam layers. Often, these additional components need to be installed under or around the foam layers, thereby occupying additional volume in the automotive interior. Further still, common foam materials and chemistries, such as polyurethane foam, may involve the use of regulated constituents or other materials which require special handling and/or care during manufacture. Moreover, in traditional seating designs, the polyurethane foam is typically supported by steel or other metal suspension components. However, these materials can be corrosive.

Accordingly, it is desirable to develop an alternative to foam automotive seating designs to address the drawbacks identified above, while retaining, or improving upon, as many benefits of the foamed seating designs as possible, such as comfort and adjustability characteristics.

SUMMARY

In one aspect a seat assembly includes a frame, a seating base layer arranged on the frame and a compression limiter layer arranged on the seating base layer. The compression limiter layer includes a coil portion and a wave portion having a curved profile when the seat assembly is in a non-actuated condition. The wave portion includes a plurality of wave elements and one or more ribs connected between the wave elements. The seat assembly further includes a load distribution layer connected to the compression limiter layer and an adjustment module movable between a rear position and a forward position. The adjustment module is configured to move the wave portion between a retracted position and an extended position.

The plurality of wave elements may include a plurality of first wave elements and a plurality of second wave elements. First wave elements of the plurality of first wave elements may be alternately positioned with second wave elements of the plurality of second wave elements. The first wave elements and the second wave elements may be movable relative to one another. The first wave elements and the second wave elements may be radially offset relative to one another.

The seat assembly may further include a retainer layer. The compression limiter layer may be disposed between the retainer layer and the load distribution layer. The first wave elements may be connected to the load distribution layer and the second wave elements may be connected to the retainer layer. The connection to the retainer layer may constrain the wave layer while allowing the wave layer to slide radially around the adjustment module.

The adjustment module may include an actuator and a body. The actuator is configured to move the body to move the adjustment module between the rear position and the forward position. The wave portion may be configured to slide relative to the body to move between the retracted position and the extended position.

The wave elements may be formed as linear wave springs. The wave elements may be made from a thermoplastic material.

According to another aspect, a compression limiter layer for a seat assembly includes a coil portion having a plurality of coil springs, and a wave portion having a curved profile. The wave portion includes a plurality of wave elements and one or more ribs connected between the wave elements.

The plurality of wave elements may include a plurality of first wave elements and a plurality of second wave elements. First wave elements of the plurality of first wave elements may be alternately positioned with second wave elements of the plurality of second wave elements. The first wave elements and the second wave elements may be movable relative to one another. The first wave elements and the second wave elements may be radially offset relative to one another. The wave portion may be movable between a retracted position and an extended position.

These and other features and advantages of the present device will be apparent from the following description, taken in conjunction with the accompanying sheets of drawings, and in conjunction with the appended claims.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
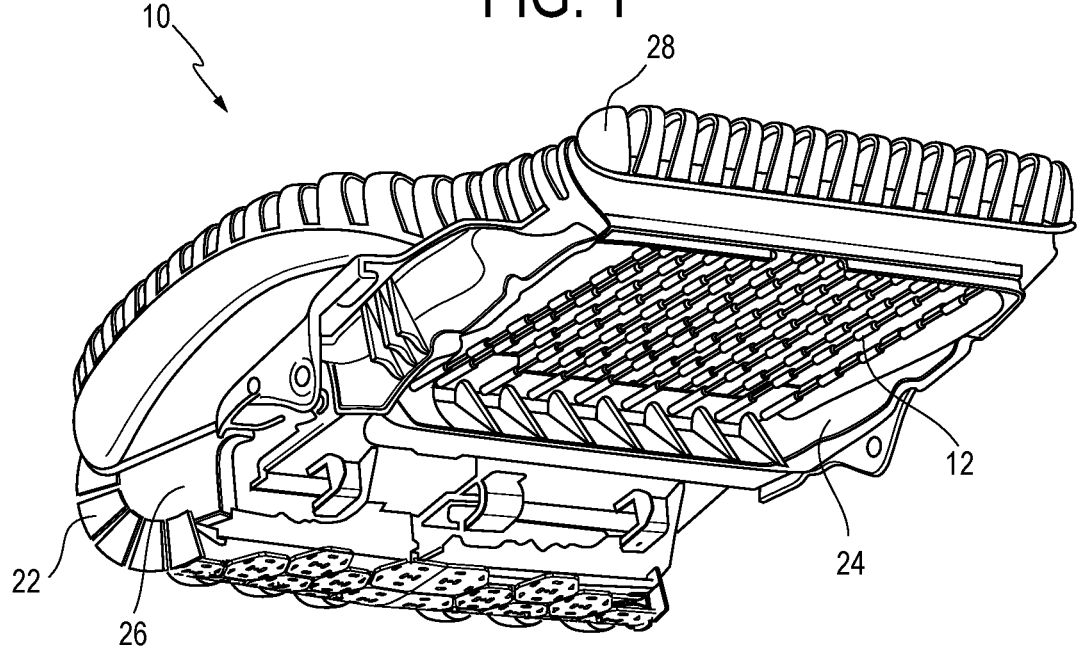
FIG. 1 is bottom perspective view of a seat assembly according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2:
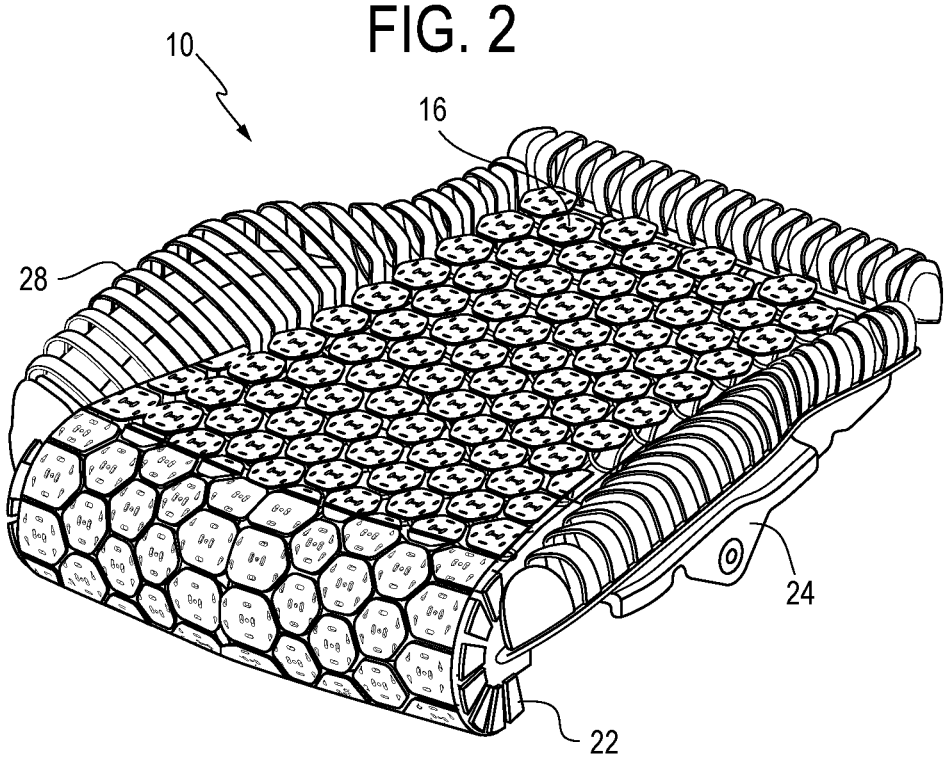
FIG. 2 is a top perspective view of the seat assembly of FIG. 1.
Figure 3:
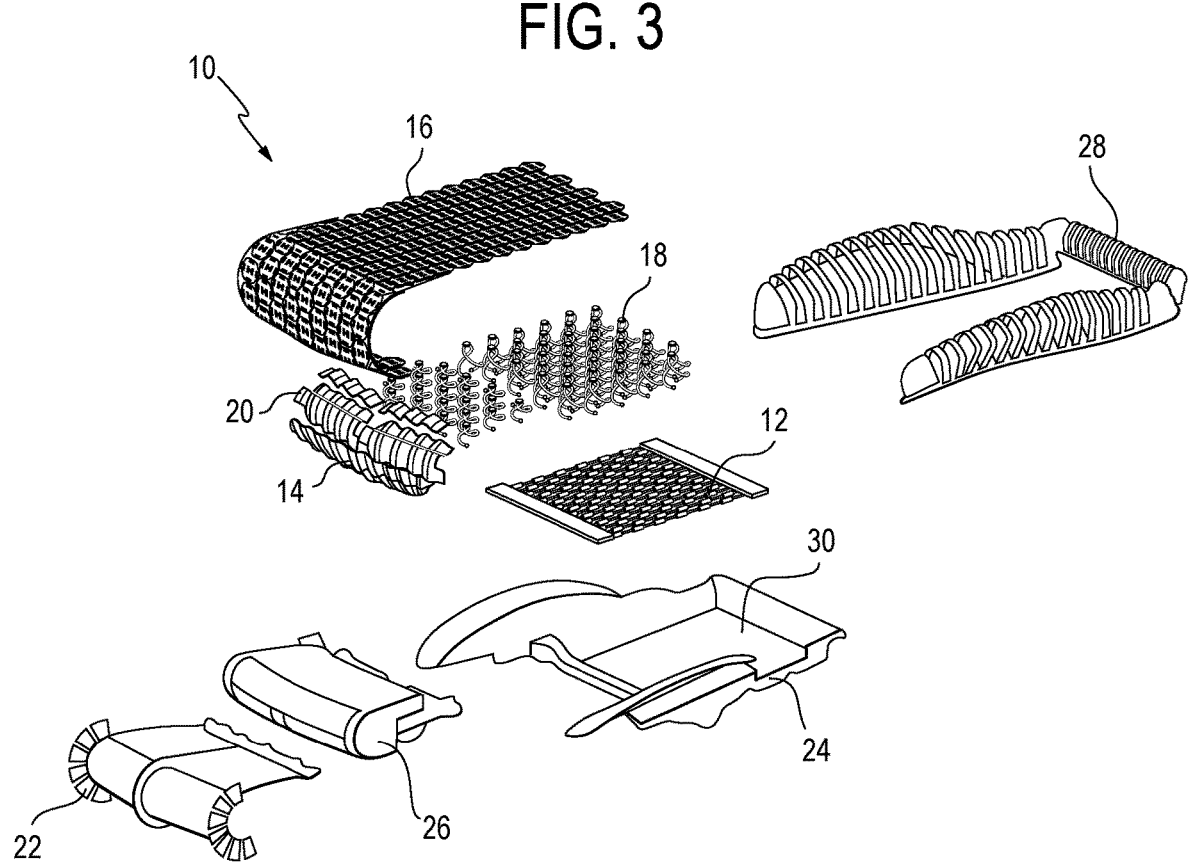
FIG. 3 is an exploded view of the seat assembly of FIGS. 1 and 2.

FIGS. 1 and 2 are bottom and top perspective views, respectively, of a seat assembly 10, according to embodiments described herein. The seat assembly 10 may be constructed as a foamless seat assembly 10. FIG. 3 is an exploded view of the seat assembly 10 of FIGS. 1 and 2. According to an embodiment, the seat assembly 10 may be an automotive seat assembly designed for installation and use in automobiles.

With reference to FIGS. 1-3, the seat assembly 10 generally includes a seating base layer 12, a compression limiter layer 14 and a load distribution layer 16. In one embodiment, the seating base layer 12 may be built using an oriented or partially oriented block copolymer, such as a thermoplastic elastomer (TPE). The compression limiter layer 14, as will be described further below, generally includes a coil portion 18 and a wave portion 20. The load distribution layer 16 may be arranged over the compression limiter layer 14 and is configured to distribute a load, for example, from an occupant seated on the seat assembly 10, across the compression limiter layer 14. A retainer layer 22 may underly at least a portion of compression limiter layer 14, for example, at the wave portion 20.

The seat assembly 10 may further include a frame 24, an adjustment module 26 and a bolster 28. The frame 24 may be configured for connection to an automotive vehicle body or frame. The adjustment module 26 is configured to adjust a position of a seating component, as described below. The bolster 28 may be included in the seat assembly 10 to provide a variable reaction spring force that substantially mimics comfort characteristics (e.g., IFD) of traditional foam seating components, but can be formed by injection molded thermoplastics in known injection molding processes. In some embodiments, the bolster 28 may extend over rigid or angled seating components to limit occupant exposure to such components and improve comfort. In one embodiment, the seat assembly 10 may also include a manifold membrane 30. The manifold membrane 30 may be used with, for example, heating and/or cooling systems (not shown) of the seat assembly 10.

Figure 4:
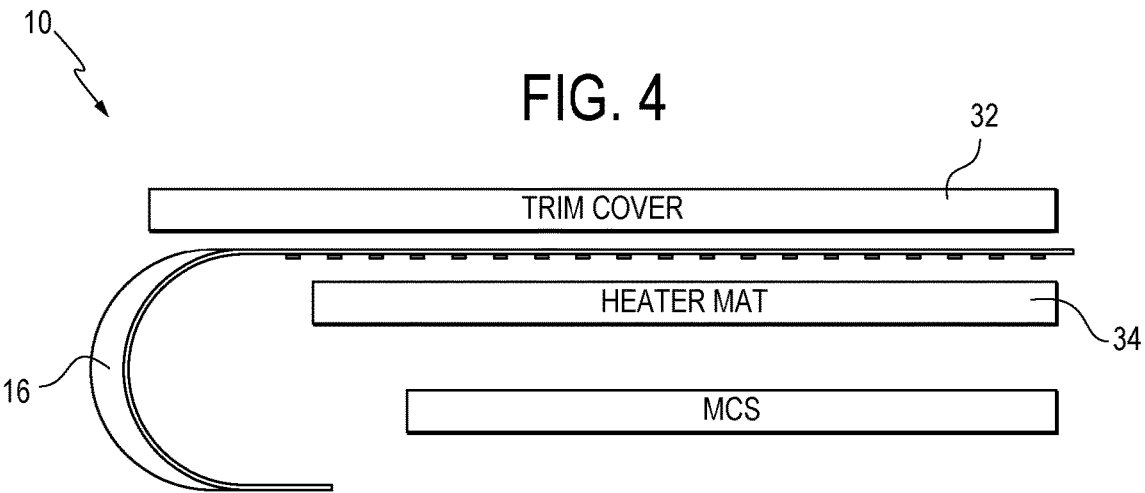
FIG. 4 is a schematic illustration of a side of a seat assembly showing the various layers of the seat.
Figure 4:
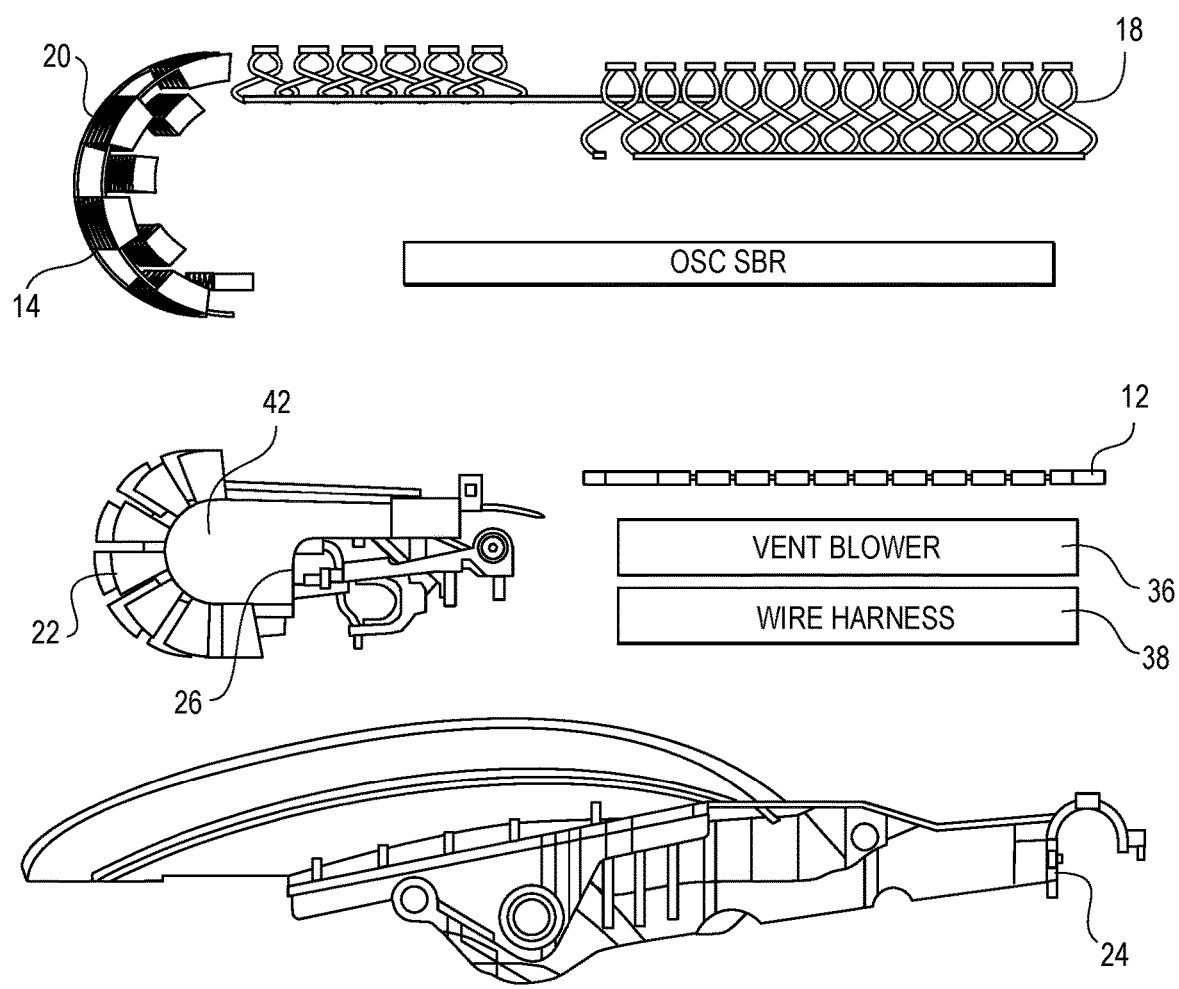

FIG. 4 is a diagram showing an exploded side view of the seat assembly 10, with some components shown schematically, according to an embodiment. In one embodiment, the seat assembly 10 may include a trim cover 32, such as leather or fabric, disposed over the load distribution layer 16. In one embodiment, the seat assembly 10 may include heating and/or cooling systems, which may include, for example, a heater mat 34 disposed under the load distribution layer 16, a vent blower 36 and a wire harness 38 which may be disposed, for instance, under the seating base layer 12 and adjacent to or within the frame 24. However, these components are not limited to such positions.

According to an embodiment, the coil portion 18 of the compression limiter layer 14 generally extends along a section of the seat assembly 10 where an occupant is seated, i.e., where a substantially vertical component of an occupant's weight will be applied to the seat assembly 10. The coil portion 18 may be formed by a plurality of coil springs extending between the seating base layer 12 and the load distribution layer 16. The coil springs may be attached to the seating base layer 12 and/or the load distribution layer 16, for example, by a plurality of snap-fit connections or other suitable attachment mechanisms.

The wave portion 20 of the compression limiter layer 14 may generally extend over a knee-support section of the seat assembly 10, designed to support an underside or back of an occupant's knee when the occupant is in a seated position. Thus, in at least one configuration, the wave portion 20 may be extend generally in linear helical shape, around a center of curvature. For example, as shown in FIG. 4, in the side view, the wave portion 20 may extend as a curved segment generally in a C-shape.

In one embodiment, the adjustment module 26 may be a knee support module configured to adjust a position of the knee-support section of the seat assembly 10. For example, as described further below, the adjustment module 26 may be actuated to move the wave portion 20. In one embodiment, the adjustment module 26 includes an actuator 40 operably connected to a body 42. The actuator 40 can be operated to drive the body 42 to adjust the position of the knee-support section.

Figure 5:
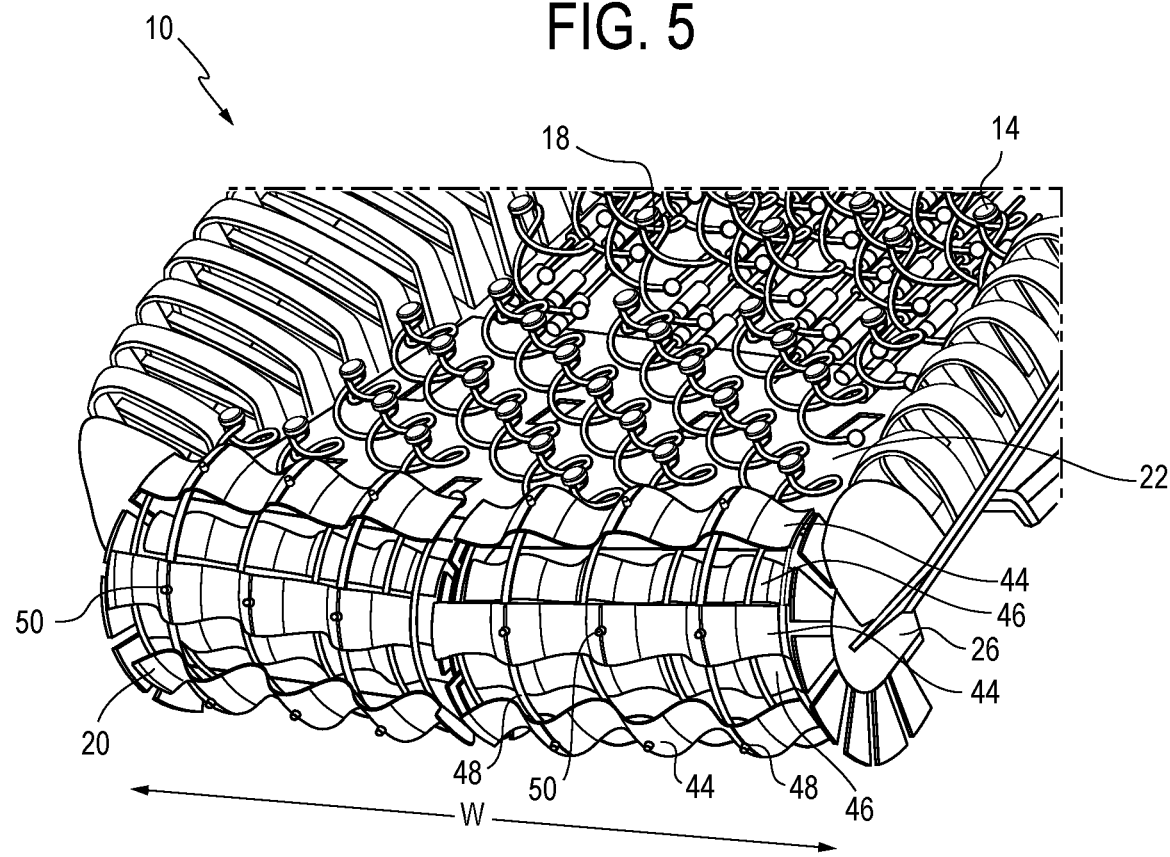
FIG. 5 is an illustration of an embodiment of a wave portion showing knee support foam replacement in a retracted position around knee adjustment modules.

FIG. 5 is an enlarged perspective view of the seat assembly 10 showing the compression limiter layer 14, including the wave portion 20 at the knee-support section, according to an embodiment. The wave portion 20 may be substantially linear in overall shape, for example, extending a width direction 'W' of the seat assembly 10. The wave portion 20 includes a plurality of wave elements 44, 46. In one embodiment, the plurality of wave elements includes one or more first wave elements 44 and one or more second wave elements 46. In one embodiment, a plurality of first and second wave elements 44, 46 are provided, and individual first and second wave elements 44, 46 are alternately positioned with respect to one another along a length direction or direction of curvature. In one embodiment, the first and second wave elements 44, 46 may be offset, or staggered, from one another in radial direction or thickness direction. For example, the first wave elements 44 may be relatively outwardly positioned (i.e., closer to an exterior of the seat assembly 10 or the load support layer 16) and the second wave elements 46 may be relative inwardly positioned (i.e., closer to the retainer layer 22 or the adjustment module 26). In one embodiment, the wave elements 44, 46 may be made from a thermoplastic material.

In one embodiment, the wave elements 44, 46 of the first and second wave elements may be formed as separate, individual springs and may include, for example, one or waves or undulations formed along their respective lengths (the lengths of the wave elements 44, 46 extend in the width direction W of the seat assembly 10 in FIG. 5). That is, the wave elements 44, 46 may be formed as substantially linear wave springs. In another embodiment, the individual wave elements 44, 46 may include cup-shaped portions or may be substantially flat. The wave elements 44, 46 may be connected to one another by one or more ribs 48. The ribs 48 are configured to flex when needed, for example, during adjustment of the knee-support section as described further below, thereby allowing movement of the first and second wave elements 44, 46.

In one embodiment, the first wave elements 44 may be connected to the load distribution layer 16 by one or more snap-fit connections or other suitable connections. For example, the first wave elements 44 may include one or more trunnions 50 or other suitable projections configured for snap-fit engagement with an underside of the load distribution layer 16. Similarly, the second wave elements 46 may be connected to the retainer layer 22 by one or more trunnions (not shown) or similar suitable projections configured for snap-fit engagement with the retainer layer 22. However, the present disclosure is not limited to such snap-fit engagements, and other suitable connections are envisioned.

Figure 6A:
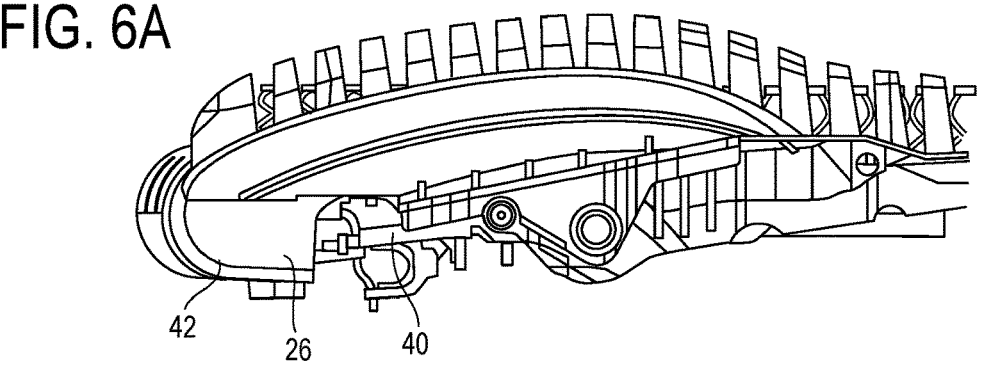
FIGS. 6A and 6B illustrate an adjustment module in a rear position (FIG. 6A) and in a forward position (FIG. 6B) according to embodiments.
Figure 6B:
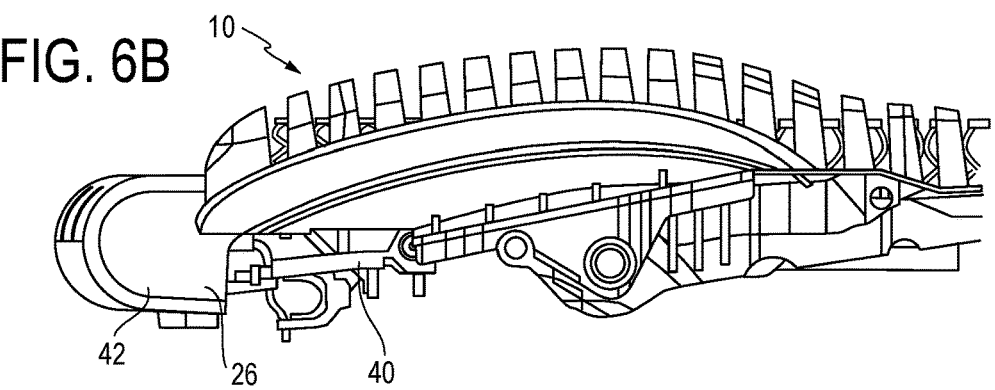

FIGS. 6A and 6B are side views of the seat assembly 10 with the adjustment module 26 in a rear (or retracted) position (FIG. 6A) and a forward (or extended) position (FIG. 6B), according to embodiments of the present disclosure. As shown in FIGS. 6A and 6B, to adjust a position of the knee-support section of the seat assembly 10, the actuator 40 is operated to move the body 42 outward from the position in FIG. 6A to the position in FIG. 6B to extend a length of the knee-support section. Conversely, the actuator 40 may be operated to move the body 42 inward from the position in FIG. 6B to the position in FIG. 6A to reduce a length of the knee-support section.

Figure 7A:
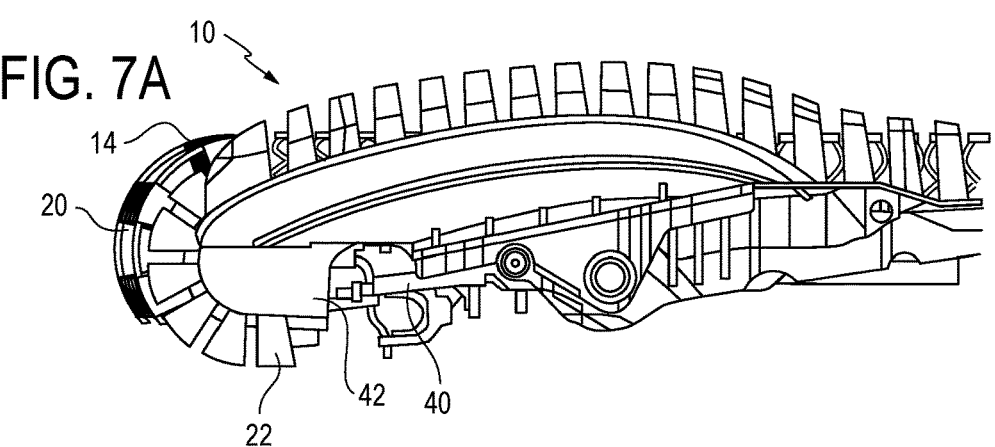
FIGS. 7A and 7B are similar to FIGS. 6A and 6B, showing embodiments of the present layered seat configuration.
Figure 7B:
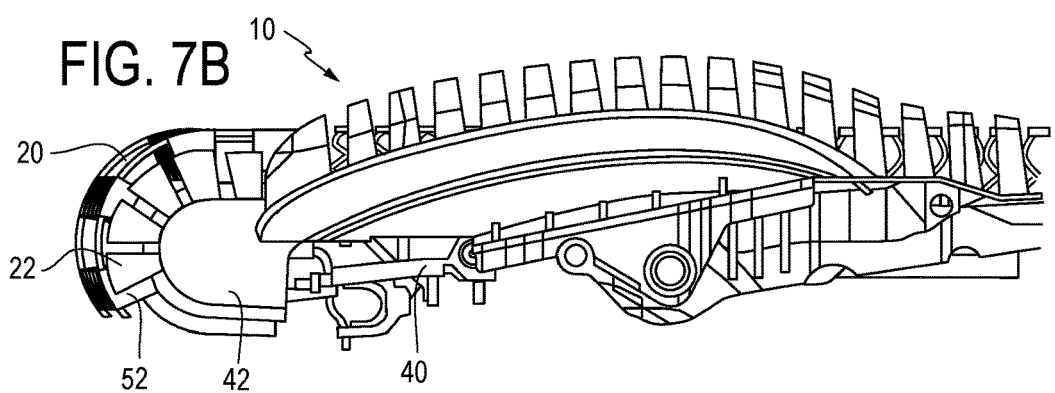

FIGS. 7A and 7B are side views of the seat assembly 10 having the retainer 22 and compression limiter layer 14, including the wave portion 20, positioned over the adjustment module 26 (see FIGS. 6A, 6B), with the adjustment module 26 in the rear (retracted) position (FIG. 7A) and the forward (extended) position (FIG. 7B), according to embodiments of the present disclosure. The wave portion 20, including the first and second wave elements 44, 46 (see FIG. 5), is configured such that movement of the adjustment module 26 from the rear position to forward position, and vice versa, causes the wave portion 20 to slide along a surface of the body 42 without binding, wrinkling or loosing desired or customer-specified IFD requirements. Therefore, the compression limiter layer 14, by way of the wave portion 20 of the embodiments described herein, can provide consistent comfort in all positions of adjustment module 26. The retainer layer 22 is configured for sliding movement relative to a surface of the body 42 with the wave portion 20.

The sliding movement of the wave portion 20 is provided by the arrangement of the first and second wave elements 44, 46, which are provided separately from one another, and are configured to move independently of one another. Thus, during sliding movement of the wave portion 20, individual first and second elements 44, 46 may be move relative to one another.

Referring still to FIGS. 7A and 7B, the wave portion 20 is in a retracted position when the adjustment module 26 is in the rear position (FIG. 7A). In the retracted position, the wave portion 20 has a substantially curved profile in the side view. Movement of the adjustment module 26 to the forward position moves the wave portion 20 to an extended position (FIG. 7B). In the extended position, according to one embodiment, the wave portion 20 is at least partially straightened, i.e., moved toward a linear profile from the curved profile, in the side view. As a result of the sliding movement of the wave portion 20 relative to the body 42, a free end 52 of the wave portion 20 changes position relative to a surface of the body 42. Conversely, movement of the adjustment module 26 from the forward position to the rear position causes movement of the wave portion 20 from the extended position to the retracted position. In addition, wave shape and load displacement can be maintained throughout adjustment.

Figure 8A:
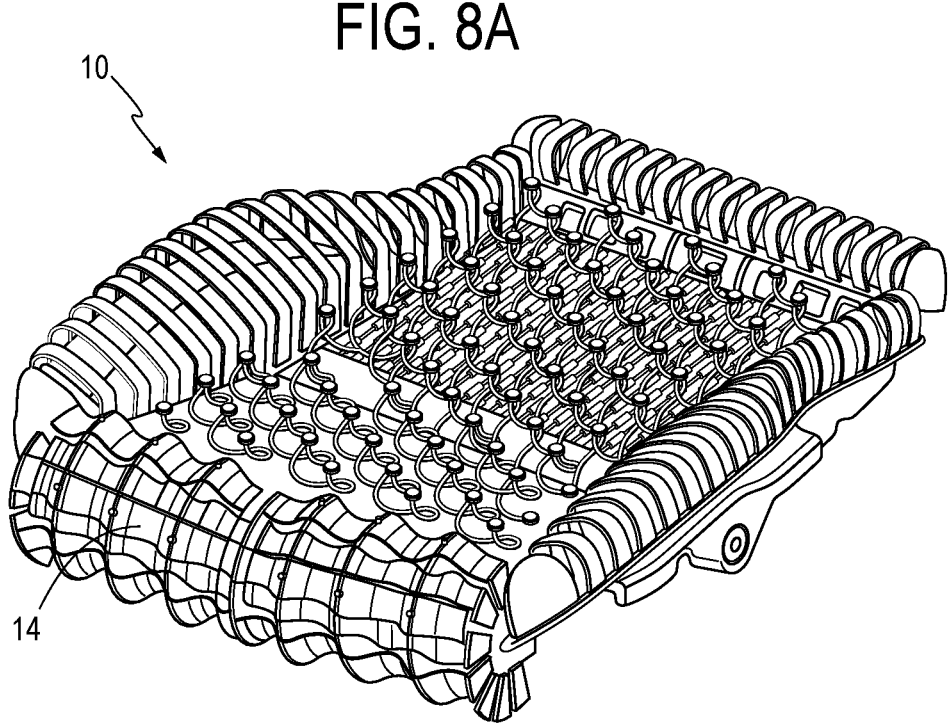
FIGS. 8A and 8B illustrate one cushion concept in a perspective view, with the load distribution layer removed for ease of illustration, and showing the compression limiter layer (FIG. 8A); and a perspective view showing the load distribution layer (FIG. 8B), according to embodiments.
Figure 8B:
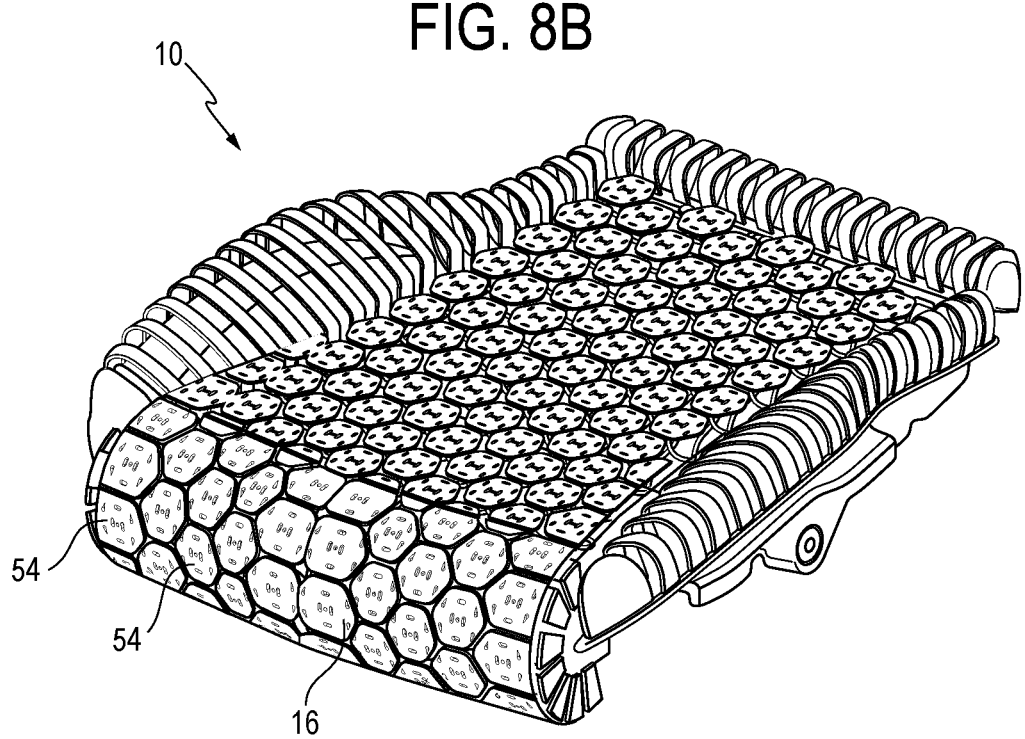

FIGS. 8A and 8B are perspective views showing the seat assembly 10 with the load distribution layer 16 removed, to more clearly illustrate the compression limiter layer 14 (FIG. 8A) and with the load distribution layer 16 installed (FIG. 8B), according to embodiments described herein. In one embodiment, the load distribution layer 16 includes a plurality of shaped segments 54 connected to another. In one embodiment, each segment 54 may be connected to the compression limiter layer 14, for example, by a snap-fit connection. In this manner, pressure applied to the load distribution layer 16 may be distributed across the segments 54 and the compression limiter layer 14 to obtain desirable IFD characteristics and pressure maps.

Figure 9:
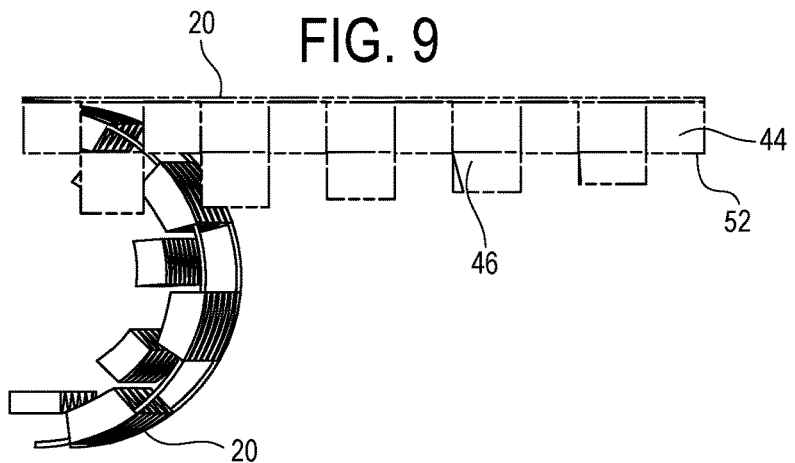
FIG. 9 is a diagram showing the wave portion as tooled, in a substantially linear configuration, and as installed in the seat assembly, in a substantially curved configuration, according to an embodiment.

FIG. 9 is a diagram showing the wave portion 20 as tooled, in a substantially linear configuration, and as installed on the seat assembly 10, in a substantially curved configuration, similar to the retracted position described in the embodiments above. As shown in FIG. 9, in one embodiment, a thickness of the second wave elements 46 may gradually decrease moving toward the free end 52 of the wave portion 20.

Figure 10:
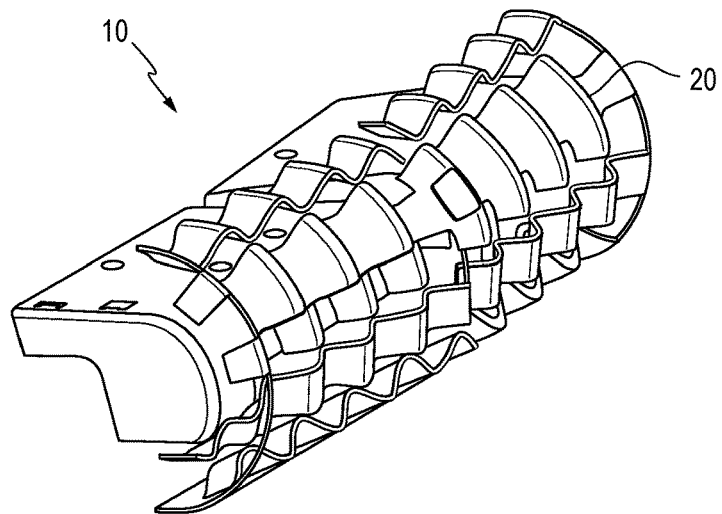
FIG. 10 is a perspective view showing the wave portion installed at a knee-support section of a seat assembly, according to an embodiment.

FIG. 10 is a perspective view showing the wave portion 20 installed at a knee-support section of a seat assembly 10, according to an embodiment.

Figure 11:
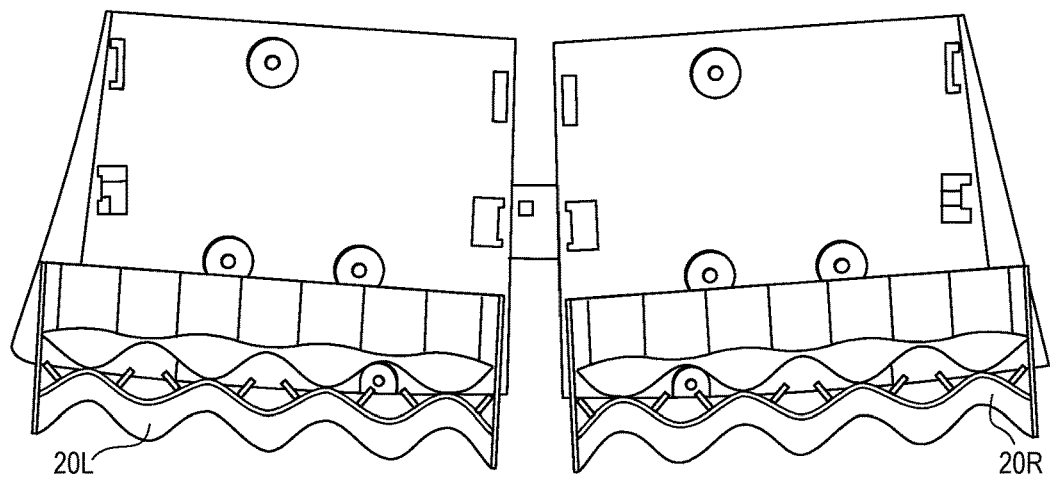
FIG. 11 is a top view showing left and right wave portions configured for independent adjustment on a seat assembly, according to an embodiment.

FIG. 11 is a top view showing left and right wave portions 20L, 20R configured for independent adjustment on a seat assembly 10, according to an embodiment. In one embodiment, the seat assembly 10 may include independently adjustable left and right knee-support sections. To this end, separate left and right wave portions 20L, 20R may be provided. Although not shown in FIG. 11, it is understood that separate left and right adjustment modules 26 can be provided as well and can be operated independently of each other.

Figure 12:
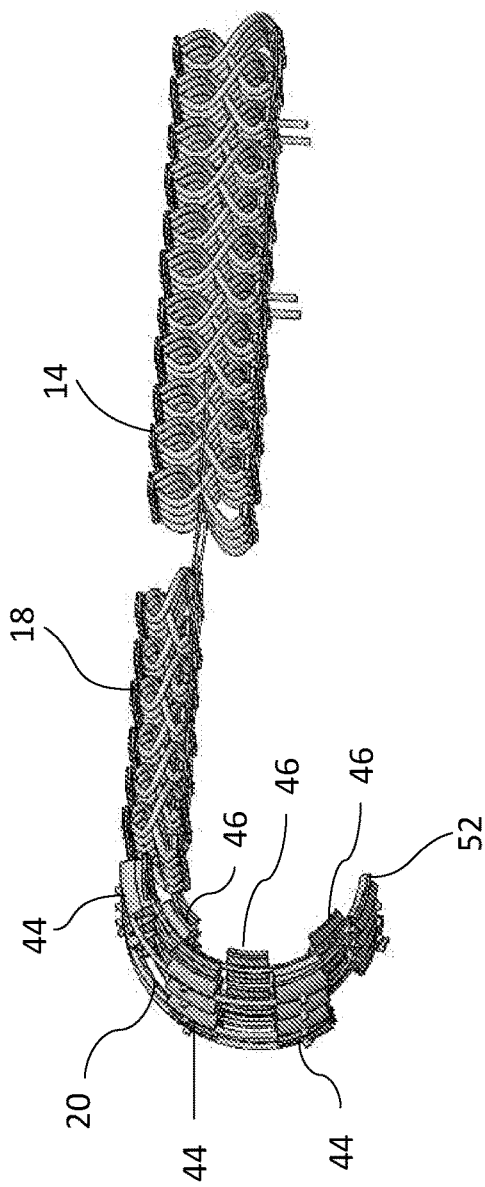
FIG. 12 is a side view of a compression limiter layer with the wave portion in a retracted position, according to an embodiment.
Figure 13:
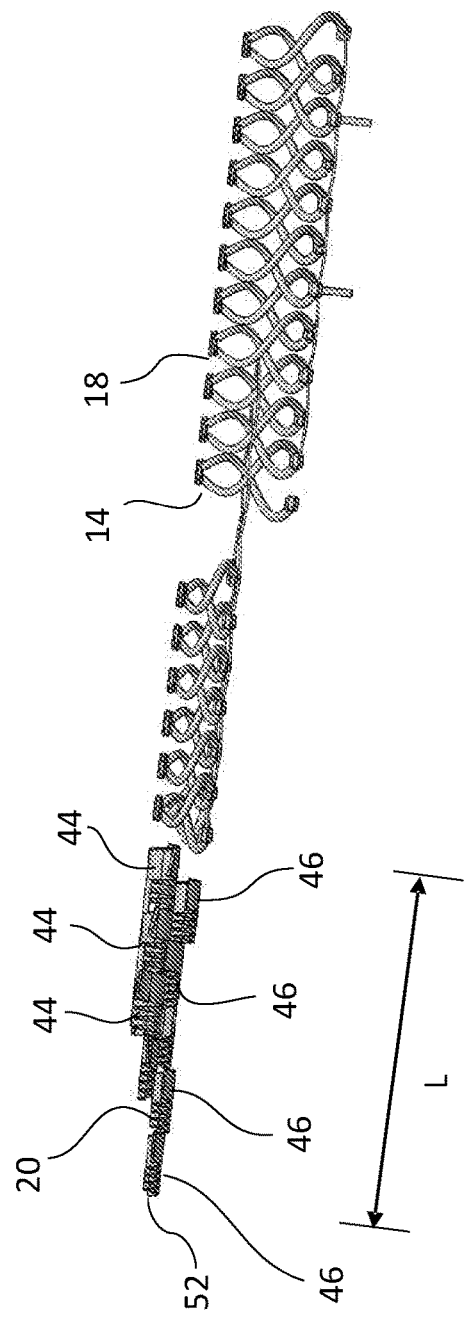
FIG. 13 is a side view of a compression limiter layer with the wave portion in a fully extended position, according to an embodiment.

FIG. 12 is a side view of the compression limiter layer 14 with the wave portion 20 in the retracted position and FIG. 13 is a side view of the compression limiter layer 14 with the wave portion 20 in a fully extended position, according to embodiments described herein. As described above, and shown in FIG. 12, in the retracted position, the wave portion 20 may have a substantially curved profile in the side view and may be shaped as a linear helix. In a fully extended position, as shown in FIG. 13, the wave portion 20 may be arranged in a substantially linear or planar configuration. The wave elements 44, 46 are configured for movement during adjustment such that stretching or pinching of a trim cover 32 is substantially limited or prevented while the wave elements 44, 46 provide a cushioning effect and desirable IFD compliance throughout the adjustment. In one embodiment, a length 1' of the wave portion 20, measured along a line or a curve, may be substantially constant during movement of the wave portion 20 between the retracted and extended positions because of the sliding motion of the wave elements 44, 46. In one embodiment, this feature may be accommodated, at least in part, by independent relative movement of the individual wave elements 44, 46 during adjustment.

Figure 14:
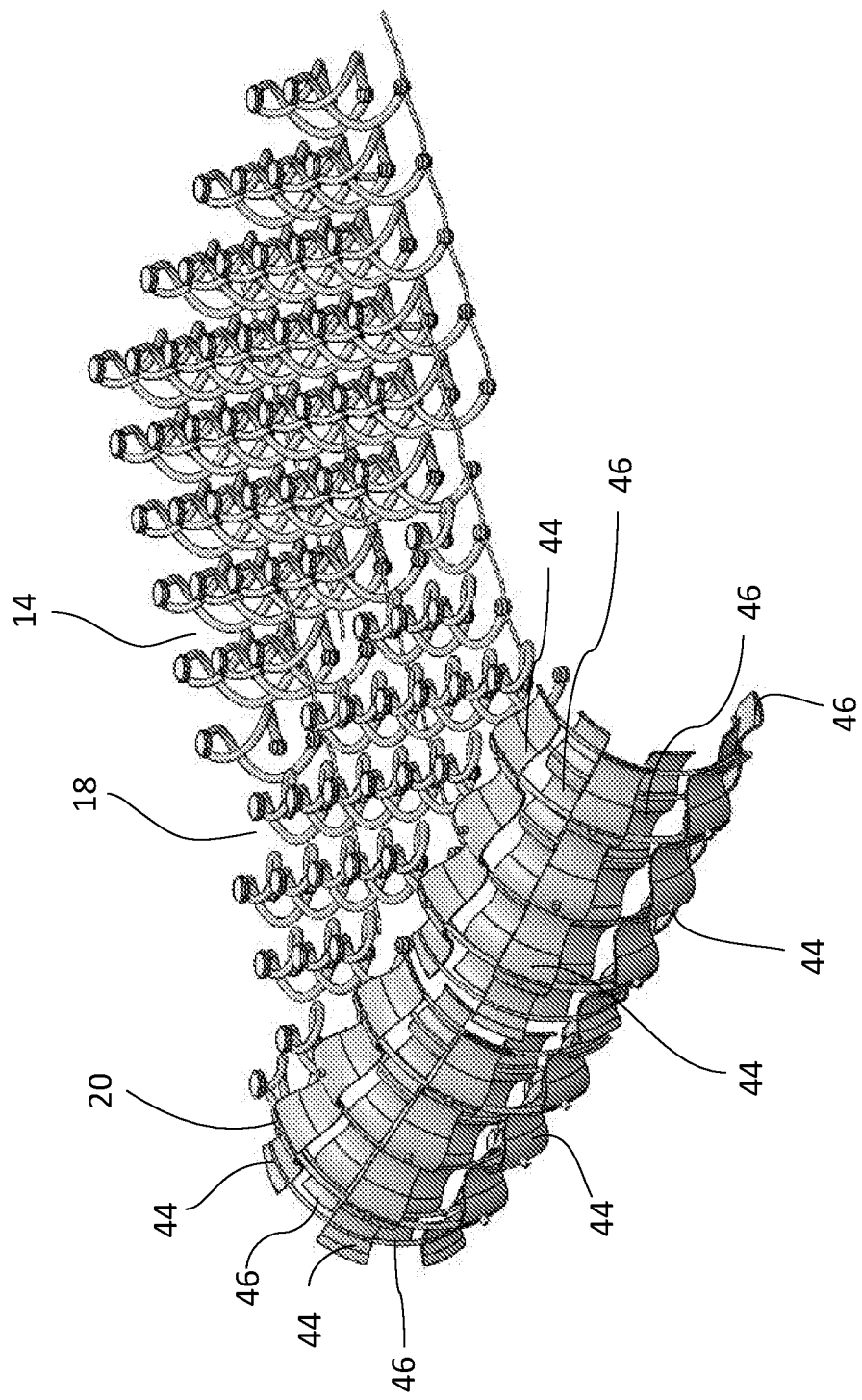
FIG. 14 is a perspective view of a compression limiter layer with the wave portion in a retracted position, according to an embodiment.

FIG. 14 is a perspective view of the compression limiter layer 14 with the wave portion 20 in the retracted position, according to an embodiment. As described in the embodiments above, the first and second wave elements 44, 46 may be alternately positioned relative to one another and offset or staggered.

In the embodiments above, the design of the wave portion 20 maintains a common length of line at a class A interface where the trim cover 32 contacts the load distribution layer 16. The length of line design rule enables the wave portion to fold and expand (i.e., retract and extend) during adjustment without wrinkling or overstretching the trim cover 32. The length of line positioning also enables manufacturers to remove and replace trim covers 32, and/or use the load distribution layer 16 is an occupant interface.

The seat assembly 10 of the embodiments described herein, in which conventional foam layers are replaced with the compression limiter layer 14 including the wave portion 20, may allow for seats to be produced at reduced costs, occupy a smaller volume, provide more breathable occupant seating interfaces, avoid absorption of fluids, be easily cleaned and can reduce emissions by using inert thermoplastic materials.

The embodiments described herein, including the compression limiter layer 14 having the wave portion 20, may also permit varying the thickness and profile shape of the seat throughout seating adjustment. Seating shapes utilizing suspension tension members have traditionally been limited to one-dimensional (1D) variable profiles by altering the tension frame shape. However, two-dimensional (2D) seat surface profiles have been limited when using suspension only. Materials that offer compression limiter function and physical thickness like foams or coils springs can offer 2D profiles to seat stylists, but are limited when wrapping around actuated radiuses, such as at knee-support sections. As illustrated in FIGS. 5, 6A, 6B, 7A and 7B, wave portion 20 described herein allows several millimeters of actuator travel while maintaining seat shape, and IFD compliance for comfort.

The wave portion 20 is also adaptable to different customer requirements through a wide range of tuning mechanisms. For example, force deflection or spring rate may be tuned by adjusting wave element width, wave element shape (flat vs. cupped), wave element material, modulus performance, top (outer) wave vs. bottom (inner) wave height and wave pitch and sign wave frequency (number of waves), and other inputs.

It has been found that the embodiments of the seat assembly 10 described herein are capable of providing an IFD compliant design that mimics or out performs foam materials used in conventional automotive seating applications during most or all adjustment positions. The adjustments highlighted in FIGS. 6A-6B and 7A-7B show an example of a range of actuated adjustment (for example, a 50 mm-100 mm range) for occupant positioning within a 33-way adjustable seat.

It should also be understood that various changes and modifications to the presently disclosed embodiments will be apparent to those skilled in the art. Such changes and modifications can be made without departing from the spirit and scope of the present disclosure and without diminishing its intended advantages. It is therefore intended that such changes and modifications be covered by the appended claims. It is further understood that various features from the embodiments described above and shown in the drawings may be combined with other embodiments described herein and shown in the drawings.

The invention claimed is:

1. A seat assembly comprising:
    a frame;
    a seating base layer arranged on the frame;
    a compression limiter layer arranged adjacent to the seating base layer, the compression limiter layer comprising a wave portion forming a knee support and having a curved profile;
    a load distribution layer connected to the compression limiter layer; and
    an adjustment module movable between a rear position and a forward position and configured to move the wave portion between a retracted position and an extended position,
    wherein the wave portion comprises a first plurality of wave elements connected to each other by a first plurality of ribs, a second plurality of wave elements connected to each other by a second plurality of ribs, and a first set of trunnions connecting the wave portion to the load distribution layer.

2. The seat assembly of claim 1, wherein each of the first plurality of wave elements are alternately positioned with each of the second plurality of wave elements.

3. The seat assembly of claim 2, wherein the first plurality of wave elements and the second plurality of wave elements are movable relative to one another.

4. The seat assembly of claim 1, further comprising a retainer layer, wherein the compression limiter layer is disposed between the retainer layer and the load distribution layer.

5. The seat assembly of claim 4, wherein a second set of trunnions connect the wave portion to the retainer layer.

6. The seat assembly of claim 1, wherein the adjustment module comprises an actuator and a body and the actuator is configured to move the body to move the adjustment module between the rear position and the forward position.

7. The seat assembly of claim 6, wherein the wave portion is configured to slide relative to the body to move between the retracted position and the extended position.

8. The seat assembly of claim 7, wherein the retainer layer slides relative to the body to move between the retracted position and the extended position.

9. The seat assembly of claim 1, wherein each of the first plurality of wave elements are formed as linear wave springs.

10. The seat assembly of claim 1, wherein the first plurality of wave elements comprise undulations along their respective lengths.

* * * * *